United States Patent
Ichihara

(10) Patent No.: US 7,664,475 B2
(45) Date of Patent: Feb. 16, 2010

(54) MULTI-BAND WIRELESS TRANSCEIVER AND METHOD OF CONTROLLING THE SAME

(75) Inventor: Masaki Ichihara, Tokyo (JP)

(73) Assignee: NEC Corporation, Tokyo (JP)

( * ) Notice: Subject to any disclaimer, the term of this patent is extended or adjusted under 35 U.S.C. 154(b) by 370 days.

(21) Appl. No.: 11/218,554

(22) Filed: Sep. 6, 2005

(65) Prior Publication Data

US 2006/0052131 A1    Mar. 9, 2006

(30) Foreign Application Priority Data

Sep. 7, 2004   (JP)  ............... 2004-260136

(51) Int. Cl.
  *H04B 1/18*   (2006.01)
(52) U.S. Cl. .................. 455/168.1; 455/552.1; 455/260; 455/76; 455/165.1; 455/553.1; 455/150.1; 455/154.1; 455/161.2; 455/176.1; 455/180.1; 455/183.1; 455/183.2; 455/188.1; 455/190.1; 455/216; 455/323; 331/34; 331/179
(58) Field of Classification Search ............ 455/552.1, 455/76, 113, 118, 165.1, 550.1, 553.1, 103, 455/132, 133, 140, 141, 147, 150.1, 154.1, 455/154.2, 161.1, 161.2, 164.1, 164.2, 166.2, 455/168.1, 176.1, 179.1, 180.1, 180.3, 182.1, 455/183.1, 183.2, 188.1, 190.1, 191.3, 192.1, 455/216, 254–260, 265, 266, 275, 277.1, 455/318, 319, 323; 331/46, 34, 179
See application file for complete search history.

(56) References Cited

U.S. PATENT DOCUMENTS

| | | | | |
|---|---|---|---|---|
| 4,387,401 A | * | 6/1983 | Henderson et al. | 348/732 |
| 6,175,746 B1 | * | 1/2001 | Nakayama et al. | 455/552.1 |
| 6,563,387 B2 | * | 5/2003 | Hirano et al. | 331/11 |
| 6,900,700 B2 | * | 5/2005 | Oosawa et al. | 331/46 |
| 7,058,380 B2 | * | 6/2006 | Sato | 455/260 |
| 7,162,216 B2 | * | 1/2007 | Kasahara et al. | 455/260 |
| 2003/0224749 A1 | * | 12/2003 | Uozumi et al. | 455/252.1 |
| 2004/0259518 A1 | * | 12/2004 | Aktas et al. | 455/323 |
| 2005/0042996 A1 | * | 2/2005 | Khlat et al. | 455/255 |

FOREIGN PATENT DOCUMENTS

| | | |
|---|---|---|
| CN | 1319301 A | 10/2001 |
| CN | 1486538 A | 3/2004 |
| JP | 11-251951 A | 9/1999 |
| JP | 2000-91941 A | 3/2000 |
| JP | 2001-186042 A | 7/2001 |
| JP | 2001-237699 A | 8/2001 |
| JP | 2002-64397 A | 2/2002 |
| JP | 2004-112750 A | 4/2004 |
| JP | 2004-129066 A | 4/2004 |

* cited by examiner

*Primary Examiner*—Edward Urban
*Assistant Examiner*—Junpeng Chen
(74) *Attorney, Agent, or Firm*—Sughrue Mion, PLLC

(57) ABSTRACT

A multi-band wireless transceiver having a plurality of signal-processing paths, and further having a function of making wireless communication through a plurality of frequency bands by selecting one of the signal-processing paths, includes a band identification circuit for identifying a frequency band, the band identification circuit identifying a frequency band in dependence on a frequency-band information received from a controller which controls an operation of the multi-band wireless transceiver, and selecting one of the signal-processing paths in accordance with the identified frequency band.

22 Claims, 11 Drawing Sheets

FIG.7

TCXO OUTPUT Frequency = 26MHz    Raster=100kHz

| Operating Band | TX/RX | Frequency(MHz) | | R | N | |
|---|---|---|---|---|---|---|
| | | MIN | MAX | | MIN | MAX |
| I | TX | 1920 | 1980 | 130 | 19200 | 19800 |
| | RX | 2110 | 2170 | 130 | 21100 | 21700 |
| II | TX | 1850 | 1910 | 130 | 18500 | 19100 |
| | RX | 1930 | 1990 | 130 | 19300 | 19900 |
| III | TX | 1710 | 1785 | 130 | 17100 | 17850 |
| | RX | 1805 | 1880 | 130 | 18050 | 18800 |

MULTI-BAND WIRELESS TRANSCEIVER AND METHOD OF CONTROLLING THE SAME

BACKGROUND OF THE INVENTION

1. Field of the Invention

The invention relates to a multi-band wireless transceiver for selecting a frequency band, for instance, in a mobile phone which makes wireless communication through a plurality of frequency bands such as W-CDMA (Wideband-Code Division Multiple Access) or GSM (Global System for Mobile communication).

The invention relates further to a method of such a multi-band wireless transceiver.

2. Description of the Related Art

There are many mobile communication systems for a mobile phone, such as W-CDMA, GSM, EDGE (an extended system of GSM) and CDMA 2000. Each of these systems is operated through a plurality of frequency bands. A conventional mobile communication terminal such as a mobile phone is designed to operate through a single frequency band among such a plurality of frequency bands.

FIG. 1 is a block diagram of a conventional wireless signal processor in a mobile communication terminal which operates through a single frequency band. In FIG. 1, wireless signals are received and transmitted in accordance with the direct conversion process.

The wireless signal processor illustrated in FIG. 1 is comprised of an antenna 1, a duplexer 3, a low-noise amplifier (LNA) 6, a filter 9, an orthogonal demodulator 13, a first local synthesizer 28 for signal reception, a second local synthesizer 29 for signal transmission, a reference oscillator 27, an orthogonal modulator 26, a driver amplifier 23, a filter 20, a power amplifier 17, and an isolator 14.

The duplexer 3 removes a signal-transmission band out of a wireless signal having been received through the antenna 1. Then, the wireless signal is amplified in the low-noise amplifier 6. The filter 9 removes bands other than a target frequency band out of the amplified wireless signal. Then, the wireless signal is demodulated into a base band signal in the orthogonal demodulator 13.

A base band signal is comprised of a signal RXI which is in-phase with a local signal, and a signal RXQ which is orthogonal with a local signal. Those signals RXI and RXQ are processed in a base band signal processing circuit (not illustrated) located downstream of the orthogonal demodulator 13. As a result, information contained in a received wireless signal is obtained.

The first local synthesizer 28 provides a local signal necessary for the orthogonal demodulation. In FIG. 1, the orthogonal demodulator 13 divides a frequency of a local signal by two. Hence, in the case of the direct conversion, a local oscillation frequency for signal reception is twice greater than a carrier frequency of a received signal.

The wireless signal processor illustrated in FIG. 1 includes a central processing unit (CPU) (not illustrated) which controls an operation of the mobile communication terminal. An oscillation frequency of the first local synthesizer 28 is determined in accordance with both divider data input into a divider in the first local synthesizer through three-line serial interfaces DATA, CLOCK and STROBE from the central processing unit, and an oscillation frequency of the reference oscillator 27.

Similarly, when signals are to be transmitted, a base band signal TXI having in-phase component in orthogonal modulation and a base band signal TXQ having orthogonal component in orthogonal modulation, both output from a circuit (not illustrated) for processing signals to be transmitted, are input into the orthogonal modulator 26.

Signals output from the orthogonal modulator 26 are amplified to some degree in the driver amplifier 23. Then, the filter 20 removes spurious components existing out of a target frequency band.

The power amplifier 17 amplifies the signals output from the filter 20. Then, the duplexer 3 suppresses noises and spurious components existing out of a target frequency band. Then, the signals are transmitted through the antenna 1.

The second local synthesizer 29 provides a local signal necessary for the orthogonal demodulation. In FIG. 1, the orthogonal modulator 26 divides a frequency of a local signal by two. Hence, in the case of the direct conversion, a local oscillation frequency for signal transmission is twice greater than a carrier frequency of a signal to be transmitted.

An oscillation frequency of the second local synthesizer 29 is determined in accordance with both divider data input into a divider in the second local synthesizer through three-line serial interfaces DATA, CLOCK and STROBE from the central processing unit, and an oscillation frequency of the reference oscillator 27.

In FIG. 1, the first and second local synthesizers 28 and 29 receive divider data through the common three-line serial interfaces. The divider data used for the first and second local synthesizers 28 and 29 is separated by identifying address bits included in the divider data.

FIG. 2 is a block diagram of an example of the first or second local synthesizer 28 or 29. The illustrated synthesizer divides signals by a number.

The illustrated synthesizer is comprised basically of a phase-locked loop (PLL) circuit in which a charge pump 33 is driven in accordance with a signal output from a phase-detector 34 which is indicative of a phase difference between a phase of a signal having a reference frequency, transmitted from a reference oscillator 27 and divided by an R-divider 35, and a signal transmitted from a voltage controlled oscillator 31 and divided by an N-divider 36, and an oscillation frequency of the voltage controlled oscillator 31 is negatively fed back.

An output frequency Fo, that is, an oscillation frequency of the voltage controlled oscillator 31 is defined in the following equation.

$$Fo = Fr \times N/R$$

In the equation, Fr indicates a frequency of a signal generated in the reference oscillator 27, N indicates a number by which the N-divider 36 divides a signal, and R indicates a number by which the R-divider 35 divides a signal. However if the synthesizer employs fractional-N technology, the number N can be a rational number.

Accordingly, the oscillation frequency Fo is singly determined, if the frequency Fr and the numbers N and R are known.

The numbers N and R are transmitted to an N-register 39 and an R-register 40 through the three-line serial interfaces DATA, STROBE and CLOCK and further through a shift register 46 and an address decoder 45 from the central processing unit, when the STROBE signal rises up.

FIG. 3 is a timing chart of the DATA, STROBE and CLOCK signals.

Address data follows serial data comprised of divided data N and R. Only when an address indicated in the address data is coincident with an address of the synthesizer, the STROBE signal is transmitted to the N-register 39 and the R-register 40. Thus, the divided data N and R to be transmitted to the second local synthesizer 29 is differentiated from the divided data N and R to be transmitted to the first local synthesizer 28.

As mentioned above, the mobile communication terminal illustrated in FIG. 1 operates through a single frequency band.

There is a need for roaming in countries in which various frequency bands are used. Hence, for instance, Japanese Patent Application Publications Nos. 11-251951, 2001-186042, 2004-129066 and 2002-064397 suggest a mobile communication terminal which can be used in accordance with a plurality of systems or through a plurality of frequency bands.

Furthermore, W-CDMA which will be used for a third-generation mobile phone uses UMTS band (transmission: 1920-1980 MHz, reception: 2110-2170 MHz). However, it is expected that W-CDMA will be in short in a frequency band, if W-CDMA uses a single frequency band, specifically, UMTS band, because (a) W-CDMA will be rapidly popularized, (b) communication in which much data such as still and moving pictures is transmitted will be much increased, and (c) a flat-rate schedule is introduced, and hence, a user is allowed to transmit much data at low cost. Thus, it is suggested that a plurality of frequency bands such as PCS band and DCS band both used in conventional TDMA system is used for W-CDMA.

The detail of those frequency bands is as follows.

Band I (UMTS band)

signal transmission: 1920-1980 MHz signal reception: 2110-2170 MHz

Band II (PCS band)

signal transmission: 1850-1910 MHz signal reception: 1930-1990 MHz

Band III (DCS band)

signal transmission: 1710-1785 MHz signal reception: 1805-1880 MHz

Further frequency bands other than the above-mentioned ones are presently used for W-CDMA. Thus, it is expected that there will be a need for a multi-band wireless transceiver.

FIG. 4 is a block diagram of a multi-band wireless transceiver designed to include the wireless signal processor illustrated in FIG. 1 to be able to operate through a plurality of frequency bands (three frequency bands in FIG. 4). Operation in transmission and reception of a signal in each of the frequency bands is identical with the operation of the wireless signal processor illustrated in FIG. 1, and hence, is not explained in detail.

In a multi-band wireless transceiver, the first local synthesizer 28, the second local synthesizer 29, the orthogonal demodulator 13, and the orthogonal modulator 26 may be commonly used for a plurality of frequency bands (three frequency bands in FIG. 4). The central processing unit determines divider data to be input into the first and second local synthesizers 28 and 29 through the three-line serial interfaces DATA, CLOCK and STROBE such that the divider data covers all carrier frequencies in the plurality of frequency bands, to thereby control an oscillation frequency thereof. The first and second local synthesizers 28 and 29 are designed to be able to output local oscillation frequency signals covering all carrier frequencies in the plurality of frequency bands.

A conventional wireless signal processor is necessary to include duplexers for all frequency bands. For instance, the multi-band wireless transceiver illustrated in FIG. 4 which operates through three frequency bands is necessary to include three duplexers 3, 4 and 5. One of the duplexers 3, 4 and 5 is electrically connected to the antenna 1 through an antenna switch 2. Thus, it is necessary to carry out switching control in the antenna switch 2 by providing a control signal to the antenna switch 2 from the central processing unit through a control bus 100.

In a path through which a received signal is processed, there do not exist a single low-noise amplifier and a single filter both of which can perfectly operate in all of the three frequency bands. Accordingly, the multi-band wireless transceiver illustrated in FIG. 4 is necessary to include three signal-reception paths for the three frequency bands, each comprised of low-noise amplifiers 6, 7, 8 and filters 9, 10, 11. Accordingly, the multi-band wireless transceiver illustrated in FIG. 4 is necessary to further include a switch 12 for selecting one of the three paths in accordance with a used frequency band. The switch 12 is controlled by a reception control signal thereto from the central processing unit through a control line bus 101.

In addition, since the low-noise amplifiers 6, 7 and 8 are not concurrently driven, it is necessary to turn off a power source providing power to a low-noise amplifier(s) associated with a non-used frequency band(s), in order to reduce power consumption. Thus, it is necessary to carry out on-off control to power sources providing power to the low-noise amplifiers 6, 7 and 8, in which case, the power sources are controlled by transmitting a control signal thereto from the central processing unit through control lines 102.

In a path through which signals to be transmitted, there do not exist a driver amplifier, a filter, a power amplifier, and an isolator all of which can perfectly operate through all of the three frequency bands. Thus, the multi-band wireless transceiver illustrated in FIG. 4 is necessary to include three signal-transmission paths in association with the three frequency bands, that is, (a) first signal-transmission path: driver amplifier 23→filter 20→power amplifier 17→isolator 14;

(b) second signal-transmission path: driver amplifier 24→filter 21→power amplifier 18→isolator 15; and (c) third signal-transmission path: driver amplifier 25→filter 22→power amplifier 19→isolator 16.

Since the driver amplifiers 23, 24 and 25 are not concurrently driven and the power amplifiers 17, 18 and 19 are not concurrently driven, it is necessary to turn off a power source providing power to a driver amplifier(s) and a power amplifier(s) associated with a non-used frequency band(s), in order to reduce power consumption. Thus, it is necessary to carry out on-off control to power sources providing power to the driver amplifiers 23, 24 and 25 and the power amplifiers 17, 18 and 19, in which case, the power sources are controlled by control signals from the central processing unit through control lines 103.

Thus, in order to accomplish a multi-band wireless transceiver, it would be necessary for the multi-band wireless transceiver to include a plurality of control lines to switch a frequency band, in which case, the control lines are additionally connected to an interface between a wireless signal processor and a central processing unit. As a result, an area in which wires extend on a printed wiring board would increase, and a central processing unit would have to additionally include control ports in order to carry out switch control to a plurality of switches, and further, on/off control to power sources providing power to amplifiers as active devices.

In the conventional multi-band wireless transceiver, a frequency band actually used is determined by a central processing unit. In doing so, the central processing unit, carries out switch control to the antenna switch 2, on/off control to power sources providing power to the low-noise amplifiers 6-8, switch control to the switch 12, and on/off control to power sources providing power to the power amplifiers 17-19 and the driver amplifiers 23-25 through the control lines extending therefrom. Thus, it is unavoidable that a number of interface lines between a wireless signal processor and the central processing unit increases, and the central processing unit has to have control ports to carry out such switch control and on/off control as mentioned above, though the central processing unit can have a limited number of control ports. This is a bar to reduction in size and cost for a multi-band wireless transceiver.

SUMMARY OF THE INVENTION

In light of the above-mentioned problems in the conventional multi-band wireless transceiver, it is an object of the present invention to provide a multi-band wireless transceiver capable of effectively selecting an optimal frequency band without increase in a number of interface lines between a wireless signal processor and a central processing unit.

It is also an object of the present invention to provide a method of controlling a multi-band wireless transceiver, which is capable of doing the same as the multi-band wireless transceiver.

It is also an object of the present invention to provide a program for causing a computer to carry out a method of controlling a multi-band wireless transceiver, which is capable of doing the same as the multi-band wireless transceiver.

In one aspect of the present invention, there is provided a multi-band wireless transceiver having a plurality of signal-processing paths, and further having a function of making wireless communication through a plurality of frequency bands by selecting one of the signal-processing paths, the multi-band wireless transceiver including a band identification circuit for identifying a frequency band, the band identification circuit identifying a frequency band in dependence on a frequency-band information received from a controller which controls an operation of the multi-band wireless transceiver, and selecting one of the signal-processing paths in accordance with the identified frequency band.

It is preferable that the band identification circuit transmits a control signal by which an active device electrically connected to the selected signal-processing path is allowed to receive power supply.

The multi-band wireless transceiver may further include a first synthesizer which generate a local frequency signal for signal reception in accordance with divider data received from the controller, and a second synthesizer which generate a local frequency signal for signal transmission in accordance with divider data received from the controller, in which case, the band identification circuit receives the divider data for identifying a frequency band.

It is preferable that the band identification circuit, the first synthesizer and the second synthesizer are integrated on a common chip.

It is preferable that the band identification circuit selects a frequency band identified in dependence on divider data received by the first synthesizer, when frequency bands identified in dependence on divider data received by the first and second synthesizers are not coincident with each other.

It is preferable that the band identification circuit turns off a power source providing power to a signal-transmission path, when frequency bands identified in dependence on divider data received by the first and second synthesizers are not coincident with each other.

For instance, each of the first and second synthesizers may be comprised of a reference oscillator which generates a reference frequency signal, a voltage controlled oscillator which generates the local frequency signal, an R-divider which divides the reference frequency signal by R wherein R indicates a number equal to or greater than two, an N-divider which divides the local frequency signal by N wherein N indicates a number equal to or greater than two, a phase-detector which compares a phase of a signal divided by the R-divider to a phase of a signal divided by the N-divider, and outputs a phase-difference signal indicating a difference between the phases, a charge pump which generates a voltage in dependence on the phase-difference signal, and carries out negative feed-back control to an oscillation frequency of the voltage controlled oscillator, an R-register which picks R-divider data directed thereto out of divider data received from the controller, and transmits the R-divider data to both the R-divider and the band identification circuit, and an N-register which picks N-divider data directed thereto out of divider data received from the controller, and transmits the N-divider data to both the N-divider and the band identification circuit.

For instance, each of the first and second synthesizers may be comprised of a plurality of voltage controlled oscillators transmitting signals having different frequency ranges from one another, and a switch for selecting one of the voltage controlled oscillators, in which case, the band identification circuit transmits a control signal indicative of a certain voltage controlled oscillator among the voltage controlled oscillators, to the switch in accordance with a frequency band identified based on the divider data.

For instance, each of the signal-processing paths may be comprised of a first path for processing a received signal, and a second path for processing a signal to be transmitted. The first path is comprised of a plurality of duplexers each in association with each of the frequency bands, an antenna switch through which a wireless frequency signal received through an antenna is transmitted to the associated duplexer among the duplexers, a plurality of low-noise amplifiers each in association with each of the frequency bands for amplifying signals output from the duplexers, a plurality of first filters each in association with each of the frequency bands for removing frequency bands other than the associated frequency band in the amplified signals, and a switch through which one of signals output from the first filters is transmitted to a common base band demodulator. The second path is comprised of a plurality of driver amplifiers each in association with each of the frequency bands for amplifying a wireless frequency signal having been modulated in accordance with a base band signal, a plurality of second filters each in association with each of the frequency bands for removing spurious parts existing out of a frequency band in the amplified wireless frequency signal, a plurality of power amplifiers each in association with each of the frequency bands for amplifying wireless frequency signals output from the second filters, and a plurality of isolators each in association with each of the frequency bands for transmitting the wireless frequency signals to the antenna through each of the duplexers and the antenna switch.

In another aspect of the present invention, there is provided a method of controlling a multi-band wireless transceiver having a plurality of signal-processing paths, and further having a function of making wireless communication through a plurality of frequency bands by selecting one of the signal-processing paths, including the steps of (a) identifying a frequency band in dependence on a frequency-band information received from a controller which controls an operation of the multi-band wireless transceiver, and (b) selecting one of the signal-processing paths in accordance with the identified frequency band.

It is preferable that the frequency band is identified in the step (a) in accordance with divider data transmitted from the controller.

It is preferable that when frequency bands identified in dependence on divider data received through signal-transmission path and signal-reception paths are not coincident with each other, a frequency band identified in dependence on divider data received through signal-reception path is selected.

It is preferable that when frequency bands identified in dependence on divider data received through signal-transmission path and signal-reception paths are not coincident with each other, a power source providing power to a signal-transmission path is turned off.

In still another aspect of the present invention, there is provided a program for causing a computer to carry out a method of controlling a multi-band wireless transceiver having a plurality of signal-processing paths, and further having a function of making wireless communication through a plurality of frequency bands by selecting one of the signal-processing paths, steps executed by the computer in accordance with the program including (a) identifying a frequency band in dependence on a frequency-band information received from a controller which controls an operation of the multi-band wireless transceiver, and (b) selecting one of the signal-processing paths in accordance with the identified frequency band.

In yet another aspect of the present invention, there is provided a mobile communication terminal including an antenna, a controller which controls an operation of the mobile communication terminal, a wireless signal processor which processes wireless signals having been received through the antenna and signals to be transmitted through the antenna, under control of the controller, a speaker through which a user inputs voice signals into the controller, a microphone through which a user listens to voice signals having been received through the antenna and having been processed in the signal processor, a keyboard through which a user transmits commands into the controller, and a display on which images and data are displayed under control of the controller. The wireless signal processor includes the above-mentioned multi-band wireless transceiver.

For instance, the mobile communication terminal may be comprised of a mobile phone.

For instance, the mobile phone may be comprised of a foldable mobile phone.

In further another aspect of the present invention, there is provided a program for causing a computer to carry out a method of controlling a multi-band wireless transceiver in a mobile communication terminal, having a plurality of signal-processing paths, and further having a function of making wireless communication through a plurality of frequency bands by selecting one of the signal-processing paths, steps executed by the computer in accordance with the program including (a) identifying a frequency band in dependence on a frequency-band information received from a controller which controls an operation of the multi-band wireless transceiver, and (b) selecting one of the signal-processing paths in accordance with the identified frequency band.

The advantages obtained by the aforementioned present invention will be described hereinbelow.

In the multi-band wireless transceiver in accordance with the present invention, the band identification circuit carries out switch control to an antenna switch, on/off control to power sources providing power to low-noise amplifiers, switch control to a switch for switching paths, and on/off control to power sources providing power to power amplifiers and driver amplifiers, in accordance with a signal identifying a frequency band, transmitted from a controller.

Thus, the present invention makes it possible to effectively switch a frequency band without increase in a number of interface lines between a wireless signal processor and a controller. Furthermore, it is no longer necessary for a controller such as a central processing unit to have additional control ports. Thus, the multi-band wireless transceiver in accordance with the present invention can be fabricated smaller in size and lower in cost than the conventional multi-band wireless transceiver.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 7 shows an example of R and N in association with frequency bands (bands I to III) of W-CDMA.

DESCRIPTION OF THE PREFERRED EMBODIMENTS

Preferred embodiments in accordance with the present invention will be explained hereinbelow with reference to drawings.

First Embodiment

Figure 5:
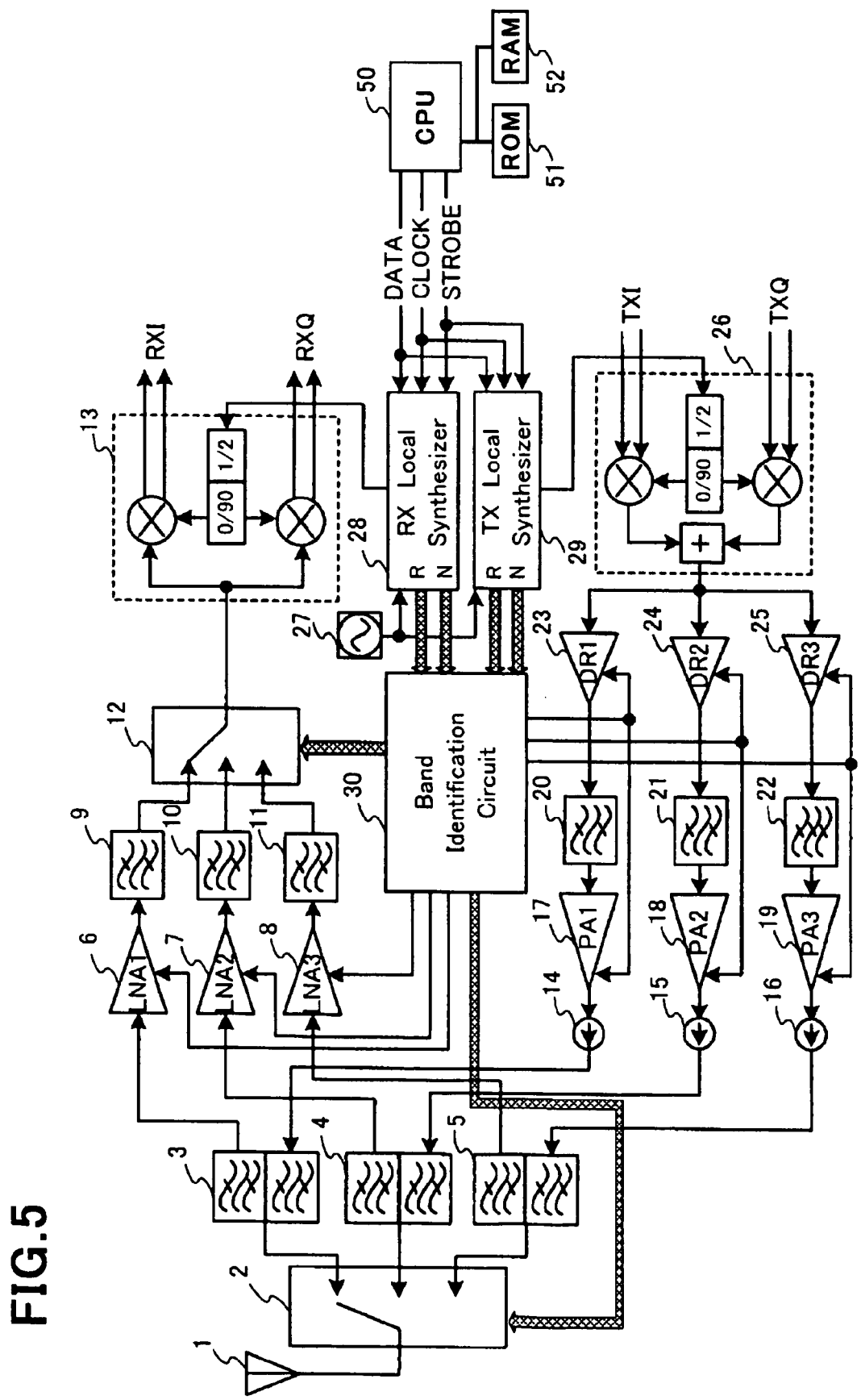
FIG. 5 is a block diagram of a multi-band wireless transceiver in accordance with the first embodiment of the present invention.

FIG. 5 is a block diagram of a multi-band wireless transceiver in accordance with the first embodiment of the present invention.

Figure 4:
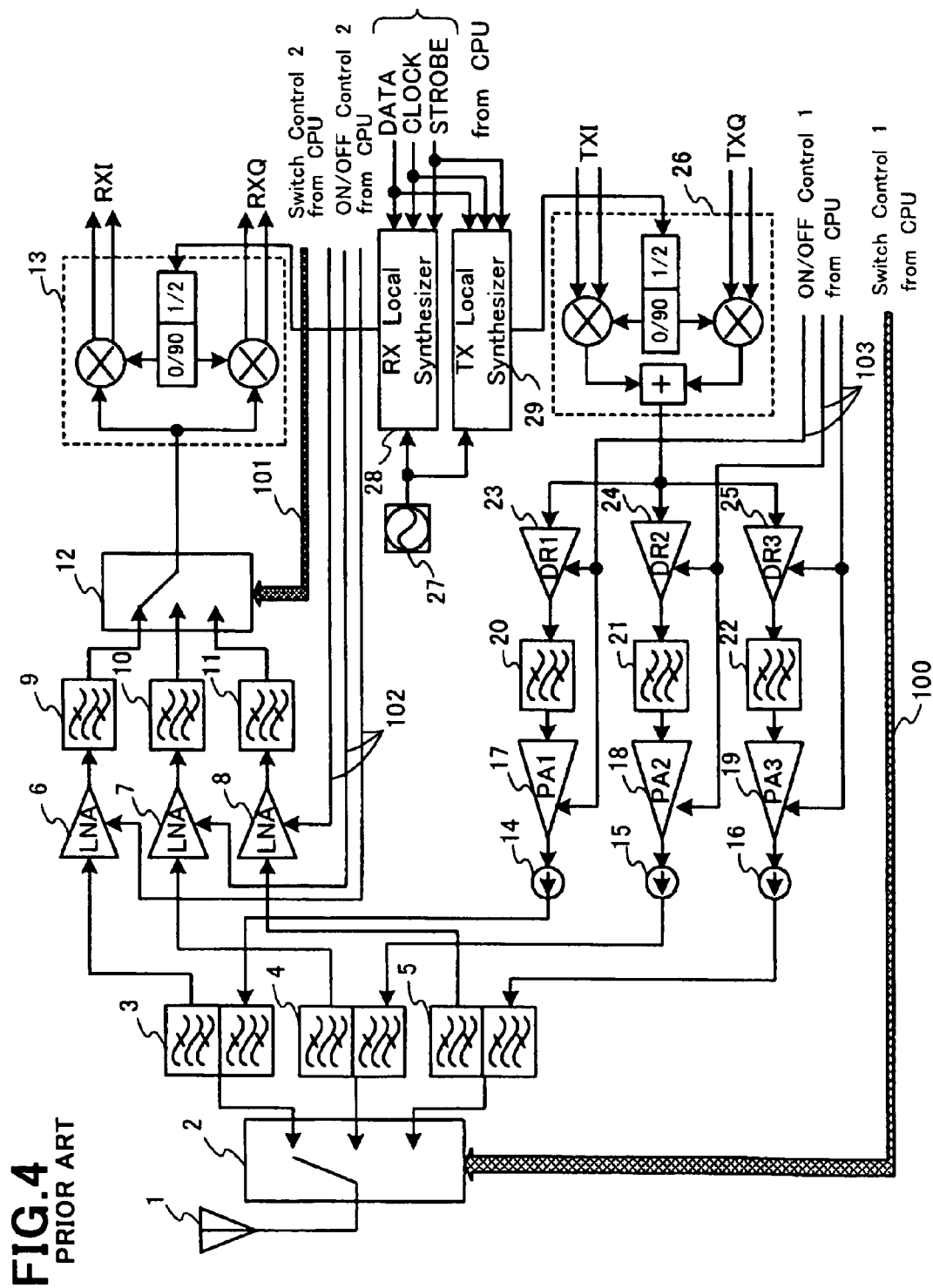
FIG. 4 is a block diagram of a multi-band wireless transceiver designed to include the wireless signal processor illustrated in FIG. 1.

Various systems such as W-CDMA, GSM, EDGE or CDMA 2000 may be applied to the multi-band wireless transceiver. In the first embodiment, it is assumed that W-CDMA is applied to the multi-band wireless transceiver. Operation for transmitting and receiving signals in each of frequency bands is identical with the operation in the multi-band wireless transceiver illustrated in FIG. 4, and hence, is not explained hereinbelow.

The multi-band wireless transceiver in accordance with the first embodiment is comprised of an antenna 1, an antenna switch 2, first to third duplexers 3, 4 and 5, first to third low-noise amplifiers (LNA) 6, 7 and 8, filters 9, 10 and 11, a switch 12, an orthogonal demodulator 13, first to third driver amplifiers 23, 24 and 25, filters 20, 21 and 22, first to third power amplifiers 17, 18 and 19, first to third isolators 14, 15, and 16, a reference oscillator 27, a first local synthesizer 28 for signal reception, a second local synthesizer 29 for signal transmission, a band identification circuit 30, an orthogonal modulator 26.

The multi-band wireless transceiver includes the first to third duplexers 3, 4 and 5 in association with the frequency bands I, II and III. One of the first to third duplexers 3, 4 and 5 is electrically connected to the antenna 1 through the antenna switch 2. The antenna switch 2 selects one of the first to third duplexers 3, 4 and 5 in accordance with a control bus transmitted from the band identification circuit 30.

The multi-band wireless transceiver includes three paths through which received signals run. Each of the paths is comprised of one of the first to third low-noise amplifiers 6 to 8, one of the filters 9 to 11, and the switch 12. The switch 12 selects one of three paths comprised of the first low-noise amplifier 6 and the first filter 9, the second low-noise amplifier 7 and the first filter 10, and the third low-noise amplifier 8 and the first filter 11, in accordance with a frequency band to be used.

In order to reduce power consumption, a power source(s) providing power to the low-noise amplifier(s) associated with a non-used frequency band(s) is turned off.

A control bus for controlling the operation of the switch 12 is transmitted to the switch 12 from the band identification circuit 30. A control signal for turning off a power source(s) is transmitted to the first to third low-noise amplifiers 6 to 8 from the band identification circuit 30.

The multi-band wireless transceiver has three signal-transmission paths in association with the three frequency bands I, II and III, that is, (a) first signal-transmission path: driver amplifier 23→filter 20→power amplifier 17→isolator 14;

(b) second signal-transmission path: driver amplifier 24→filter 21→power amplifier 18→isolator 15; and (c) third signal-transmission path: driver amplifier 25→filter 22→power amplifier 19→isolator 16.

In order to reduce power consumption, a power source(s) providing power to the driver amplifier(s) and the power amplifier(s) existing in a signal-transmission path associated with a non-used frequency band(s) is turned off.

A control signal for controlling on/off of the driver amplifier(s) and the power amplifier(s) is transmitted to the driver amplifier(s) and the power amplifier(s) from the band identification circuit 30.

The multi-band wireless transceiver includes a central processing unit 50, a first memory 51, and a second memory 52.

The first memory 51 is comprised of a read only memory (ROM), and the second memory 52 is comprised of a random access memory (RAM).

The first memory 51 stores therein a program for operating the central processing unit 50. The second memory 52 stores therein various data and parameters. The central processing unit 50 reads the program out of the first memory 51, and executes the program. Thus, the central processing unit 50 operates in accordance with the program stored in the first memory 51.

The central processing unit 50 transmits divider data N and R to the first and second local synthesizers 28 and 29. The divider data N and R are further transmitted to the band identification circuit 30 from the first and second local synthesizers 28 and 29.

Hence, it is preferable to position the band identification circuit 30 in the vicinity of the first and second local synthesizers 28 and 29. In particular, it is preferable that the band identification circuit 30, the first local synthesizer 28 and the second local synthesizer 29 are integrated on a common chip.

The band identification circuit 30 identifies a frequency band indicated by the central processing unit 50, in accordance with the divider data N and R input thereinto through the first and second local synthesizers 28 and 29. Then, the band identification circuit 30 transmits the control signals to carry out the above-mentioned switch control and on/off control in accordance with the identified frequency band.

In the multi-band wireless transceiver in accordance with the first embodiment, the band identification circuit 30 carries out switch control to the switches 2 and 12, and on/off control of the low-noise amplifiers 6 to 8, the driver amplifiers 23 to 25, and the power amplifiers 17 to 19. Hence, it is no longer necessary for the band identification circuit 30 to include such control lines as the control lines 100, 101, 102 and 103 illustrated in FIG. 4. Thus, it is possible to simplify an interface between the synthesizers 28-29 and the central processing unit 50. Furthermore, it is no longer necessary for the central processing unit 50 to have additional control ports.

Figure 6:
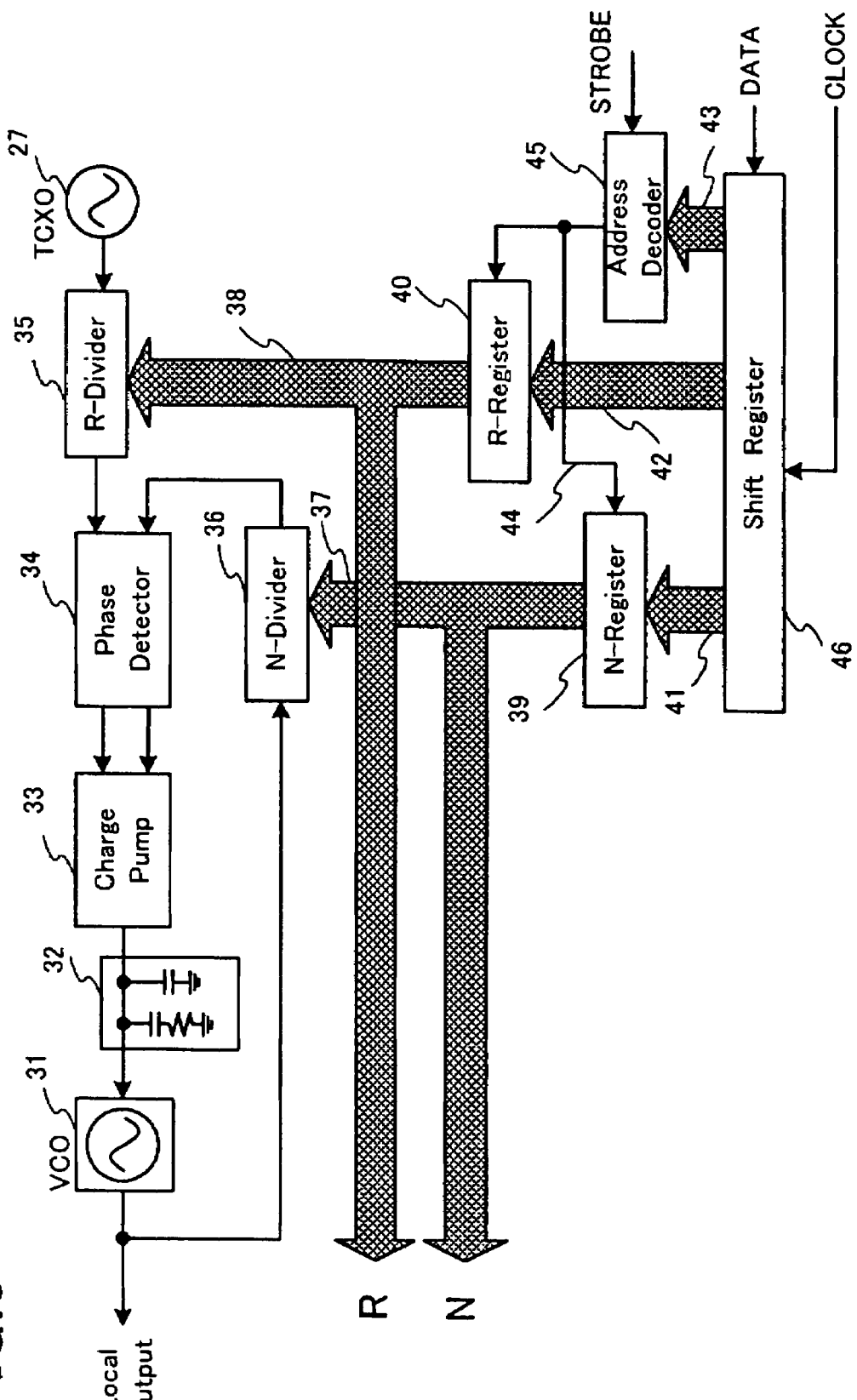
FIG. 6 is a block diagram of an example of a local synthesizer used in the wireless signal processor illustrated in FIG. 5.

FIG. 6 is a block diagram of an example of the first or second local synthesizer 28 or 29.

The first and second local synthesizer 28 and 29 divide signals by a number. A synthesizer may have various structures. If a synthesizer can vary a local frequency in accordance with a control signal transmitted from a central processing unit, such a synthesizer may be applied to the multi-band wireless transceiver in accordance with the first embodiment. The example illustrated in FIG. 6 does not limit the scope of the present invention.

The synthesizer illustrated in FIG. 6 is comprised of a voltage controlled oscillator 31, a loop filter 32, a charge pump 33, a phase detector 34, an R-divider 35, a reference oscillator 27, an N-divider 36, an N-register 39, an R-divider 40, an address decoder 45, and a shift register 46.

The synthesizer illustrated in FIG. 6 is comprised basically of a phase-locked loop (PLL) circuit in which the charge pump 33 is driven in accordance with a signal output from the phase-detector 34 which is indicative of a phase difference between a phase of a signal having a reference frequency, transmitted from the reference oscillator 27 and divided by the R-divider 35, and a signal transmitted from the voltage controlled oscillator 31 and divided by the N-divider 36, and an oscillation frequency of the voltage controlled oscillator 31 is negatively fed back. Thus, the voltage controlled oscillator 31 can transmit a signal having a stable frequency.

An output frequency Fo, that is, an oscillation frequency of the voltage controlled oscillator 31 is defined in the following equation.

$$Fo = Fr \times N/R$$

In the equation, Fr indicates a frequency of a signal transmitted from the reference oscillator 27, N indicates a number by which the N-divider 36 divides a signal, and R indicates a number by which the R-divider 35 divides a signal.

Accordingly, since the frequency Fr is in advance input into the multi-band wireless transceiver, the oscillation frequency Fo is singly determined, if the frequency Fr and the numbers N and R are known.

As illustrated in FIGS. 5 and 6, the numbers N and R are transmitted to the band identification circuit 30 through the first and second local synthesizers 28 and 29. The band identification circuit 30 identifies a frequency band to be used, by detecting a local oscillation frequency transmitted from the first and second local synthesizers 28 and 29 in accordance with the received numbers N and R.

The numbers N and R are input into the N-register 39 and the R-register 40 through the three-line serial interfaces DATA, STROBE and CLOCK and further through the shift register 46 and the address decoder 45 from the central processing unit 50, when the STROBE signal rises up.

Figure 1:
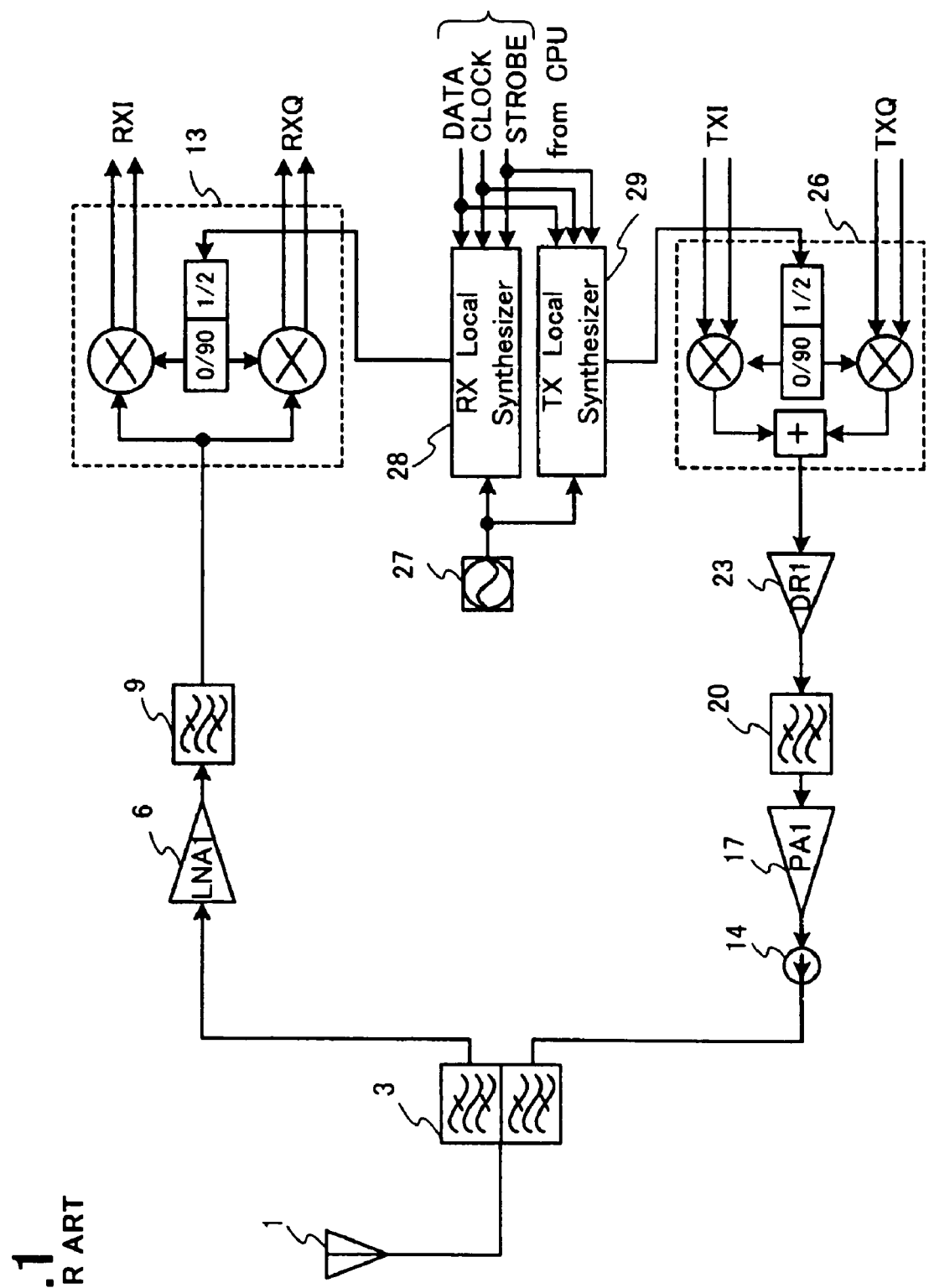
FIG. 1 is a block diagram of a conventional wireless signal processor in a mobile communication terminal which operates through a single frequency band.
Figure 2:
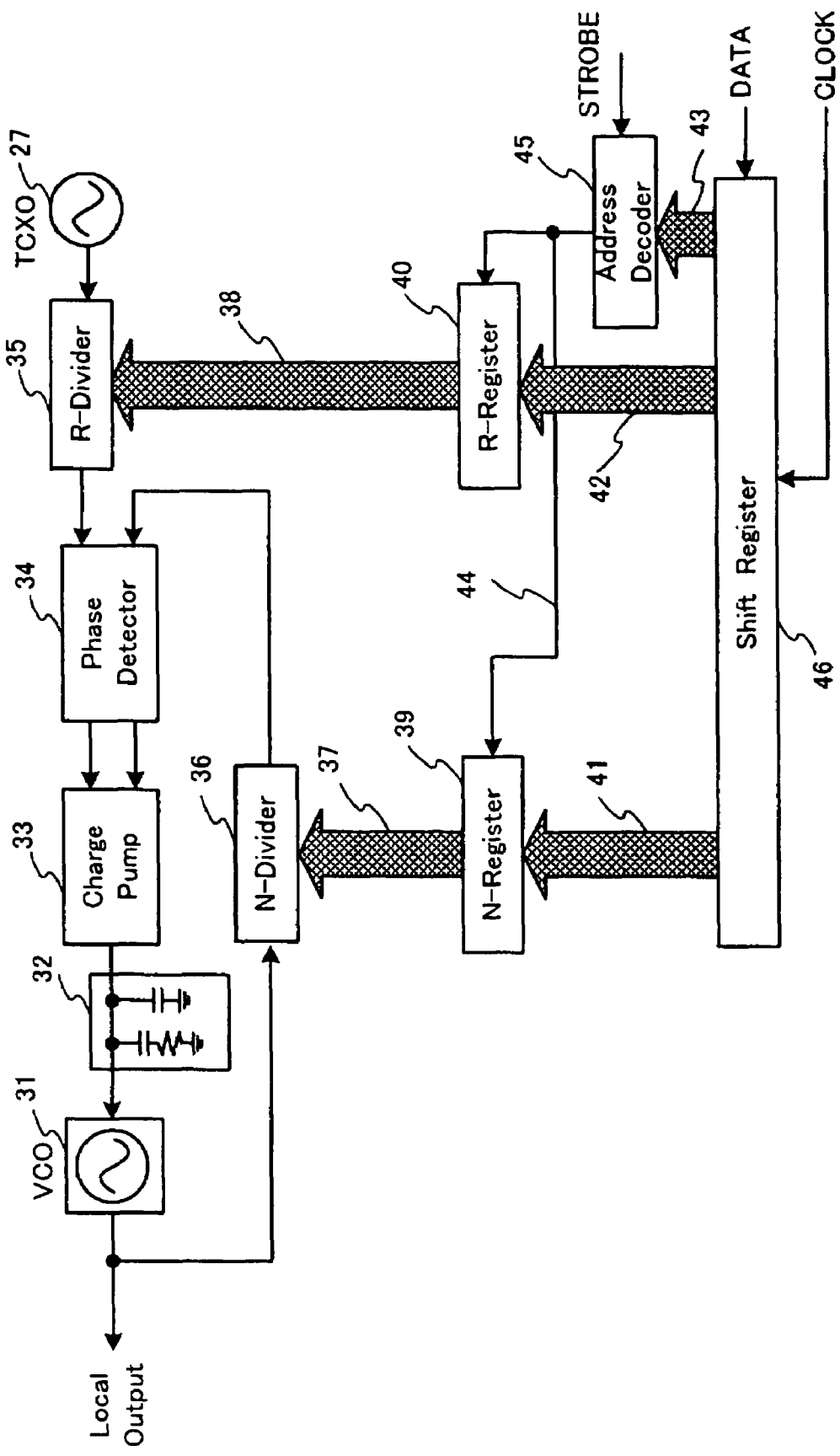
FIG. 2 is a block diagram of an example of a local synthesizer used in the conventional wireless signal processor illustrated in FIG. 1.
Figure 3:
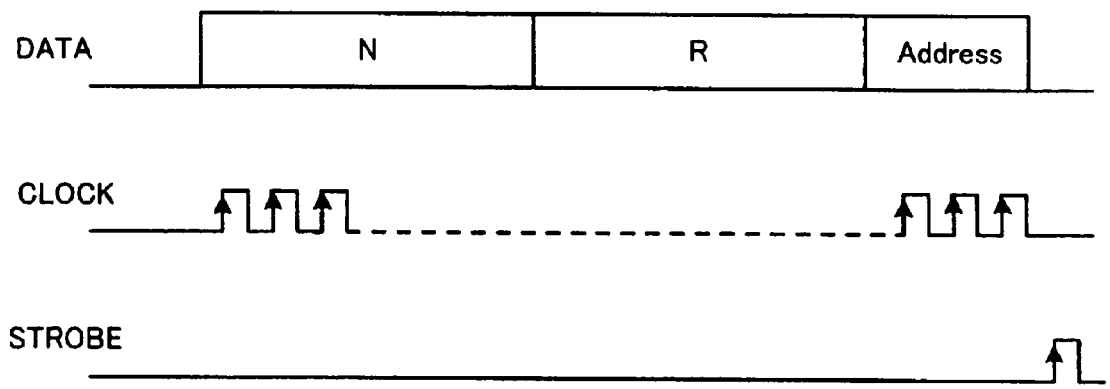
FIG. 3 is a timing chart of the DATA, STROBE and CLOCK signals.

As illustrated in FIG. 3, the address data follows serial data. Only when an address indicated in the address data is coincident with an address of the synthesizer, the STROBE signal is transmitted to the N-register 39 and the R-register 40. Thus, the data N and R to be transmitted to the second local synthesizer 29 is differentiated from the data N and R to be transmitted to the first local synthesizer 28.

FIG. 7 shows an example of R and N in association with frequency bands (bands I to III) of W-CDMA on the assumption that the reference oscillator 27 transmits a reference frequency of 26 MHz, and a minimum interval (raster) between frequencies is 100 kHz. The frequencies transmitted from the first and second local synthesizers 28 and 29 are twice greater than an actual frequency, since the orthogonal demodulator 13 and the orthogonal modulator 26 use dividers which divide a signal by two.

Hereinbelow is explained an operation of the band identification circuit 30.

The band identification circuit 30 analyzes the numbers R and N transmitted from the first and second local synthesizers 28 and 29 to thereby identify a frequency band to be used.

For instance, it is assumed that the band I is used. If the number R is equal to 130, the number N is in the range of 19200 to 19800 for signal transmission, and in the range of 21100 to 21700 for signal reception. That is, if the number N is in the above-mentioned ranges for signal transmission and signal reception, the band identification circuit 30 would detect that a frequency band to be used is the band I. The same is applied to the bands II and III.

A function of identifying a frequency band on reception of the numbers R and N can be accomplished by a simple logic circuit.

Figure 8:
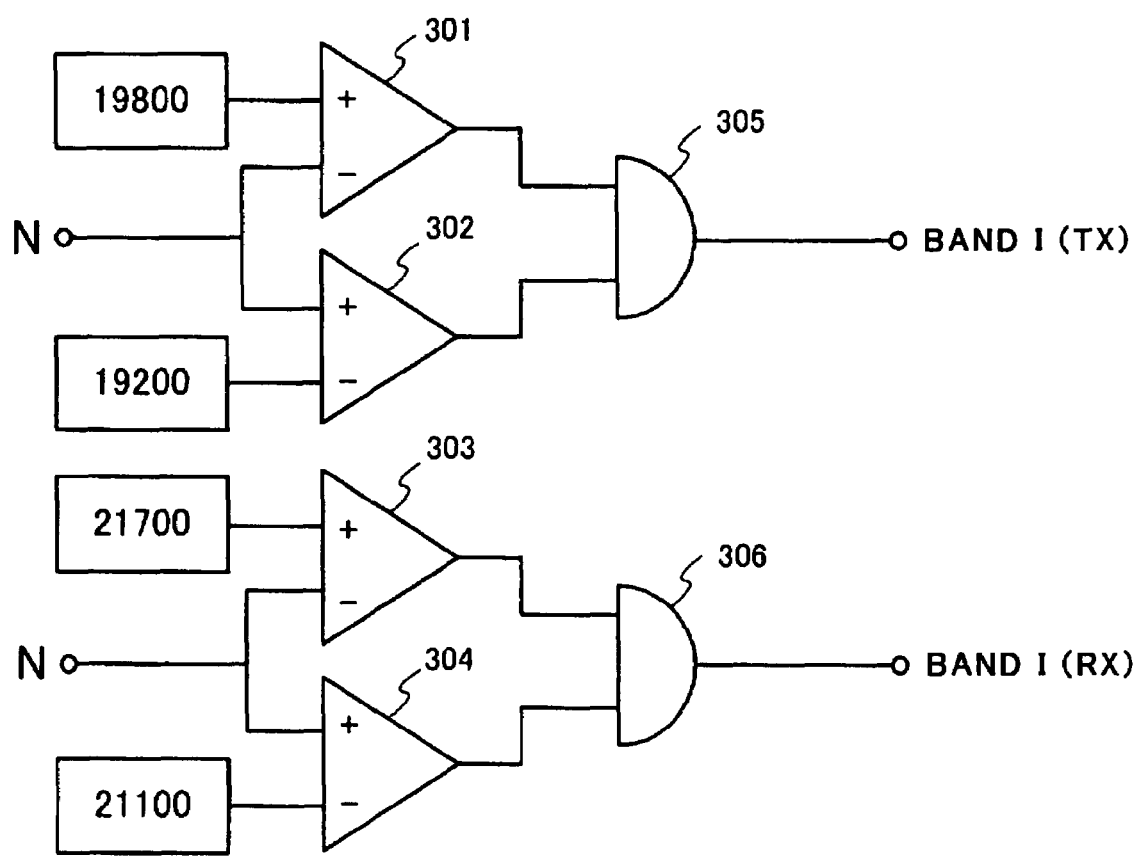
FIG. 8 is a block diagram of an example of a logic circuit as a part of the multi-band wireless transceiver in accordance with the first embodiment of the present invention.

FIG. 8 is a block diagram of an example of a logic circuit to be used for identifying the band I in the band identification circuit 30.

In the first embodiment, since the number R is fixedly equal to 130 for each of the frequency bands, it would be possible to singly identify a frequency band in dependence on the number N.

The logic circuit illustrated in FIG. 8 is comprised of a first comparator 301, a second comparator 302, a third comparator 303, a fourth comparator 304, a first AND gate 305 receiving output signals from the first and second comparators 301 and 302, and a second AND gate 306 receiving output signals from the third and fourth comparators 303 and 304.

With reference to FIG. 8, 19800 is input into a positive input terminal of the first comparator 301, and 19200 is input into a negative input terminal of the second comparator 302. Further, N is input into both a negative input terminal of the first comparator 301 and a positive input terminal of the second comparator 302. Outputs of the first and second comparators 301 and 302 are input into the first AND gate 305. The band identification circuit 30 judges whether a frequency band to be used is the band I, based on an output of the first AND gate 305.

If the number N is in the range of 19200 to 19800 both inclusive, the first AND gate 305 would output a high-level signal, in which case, the band identification circuit 30 would judge that a frequency band to be used is the band I.

If the number N is smaller than 19200 or greater than 19800, the first AND gate 305 would output a low-level signal, in which case, the band identification circuit 30 would judge that a frequency band to be used is not the band I.

Similarly, 21700 is input into a positive input terminal of the third comparator 303, and 21100 is input into a negative input terminal of the fourth comparator 304. Further, N is input into both a negative input terminal of the third comparator 303 and a positive input terminal of the fourth comparator 304. Outputs of the third and fourth comparators 303 and 304 are input into the second AND gate 306. The band identification circuit 30 judges whether a frequency band to be used is the band I, based on an output of the second AND gate 306.

If the number N is in the range of 21100 to 21700 both inclusive, the second AND gate 306 would output a high-level signal, in which case, the band identification circuit 30 would judge that a frequency band to be used is the band I.

If the number N is smaller than 21100 or greater than 21700, the second AND gate 306 would output a low-level signal, in which case, the band identification circuit 30 would judge that a frequency band to be used is not the band I.

By using a logic circuit having the same structure as that of the logic circuit illustrated in FIG. 8, it would be possible to judge whether a frequency band to be used is the band II or III.

As an alternative, the numbers N associated with the band II or III may be input into the first and second comparators 301 and 302 in place of 19800 and 19200 both associated with the band I. Thus, it would be possible to judge whether a frequency band to be used is the band I, II or III by using a single logic circuit.

The band identification circuit 30 carries out switch control to the antenna switch 2 and the switch 12 to select a path associated with a frequency band indicated by a high-level signal output from the first and second AND gates 305 and 306. Furthermore, the band identification circuit 30 carried out on/off control to power sources providing power to the low-noise amplifiers 6 to 8, the driver amplifiers 23 to 25, and the power amplifiers 17 to 19 such that the power source(s) providing power to the amplifiers existing in a path associated with a non-used frequency band(s) is turned off.

Accordingly, the multi-band wireless transceiver includes control lines between the band identification circuit 30 and the switches 2 and 12, and further between the band identification circuit 30 and the amplifiers 6 to 8, 17 to 19 and 23 to 25. This ensures that an area in which wires are formed on a printed wiring board can be reduced. Furthermore, since it is no longer necessary for the central processing unit 50 to have control ports through which switch control to the switches 2 and 12, and on/off control to the amplifiers 6 to 8, 17 to 19 and 23 to 25 are carried out. Thus, the central processing unit 50 can reduce control burden thereof and a number of control ports thereof.

In a future operation, a frequency band identified with the numbers R and N in the first local synthesize 28 may be different from a frequency band identified with the numbers R and N in the second local synthesize 29, in which case, the first and second local synthesizes 28 and 29 may be designed to have paths associated with frequency bands different from each other.

If such an operation does not exist, one of the judgments in the signal-transmission and signal-reception paths is wrong, in which case, for instance, the band identification circuit 30 may select a frequency band in accordance with the judgment of the signal-reception path, and a power source(s) in the signal-transmission path may be turned off. This ensures reduction in power consumption.

Figure 9:
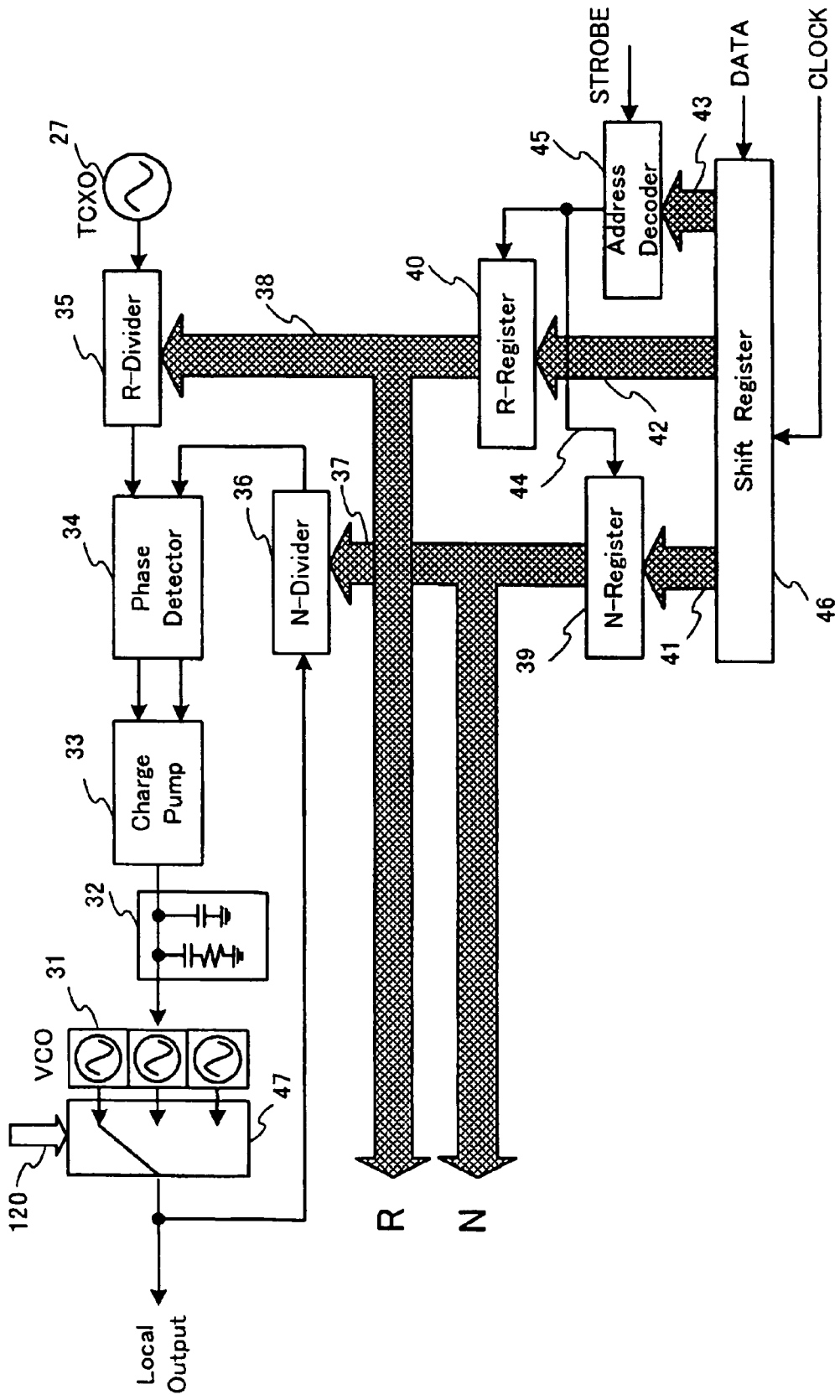
FIG. 9 is a block diagram of another example of a local synthesizer used in the wireless signal processor illustrated in FIG. 5.

FIG. 9 is a block diagram of another example of the first or second local synthesizer 28 or 29.

The illustrated synthesizer is structurally different from the synthesizer illustrated in FIG. 6 in that the synthesizer illustrated in FIG. 9 includes a plurality of the voltage controlled oscillators 31 in place of the single voltage controlled oscillator 31 (FIG. 6), and additionally includes a switch 47 for selecting one of the voltage controlled oscillators 31.

Parts or elements that correspond to those of the synthesizer illustrated in FIG. 6 have been provided with the same reference numerals.

A plurality of frequency bands may not be covered by a single voltage controlled oscillator. The synthesizer illustrated in FIG. 9 solves this problem. Each of the voltage controlled oscillators 31 covers frequency band different from others. The switch 47 receives an indication signal from the band identification circuit 30 through a control line 120, and selects one of the voltage controlled oscillators 31 in accordance with the received indication signal.

The above-mentioned first embodiment is applied to the W-CDMA type multi-band wireless transceiver. However, it should be noted that the first embodiment may be applied to a TDMA type multi-band wireless transceiver or a TDMA-CDMA type multi-band wireless transceiver.

In the first embodiment, the first and second local synthesizers 28 and 29 are of a direct conversion type. However, any synthesizer may be used, if it can switch a frequency band. The first and second local synthesizers 28 and 29 may be fabricated as a single synthesizer.

Second Embodiment

Figure 10:
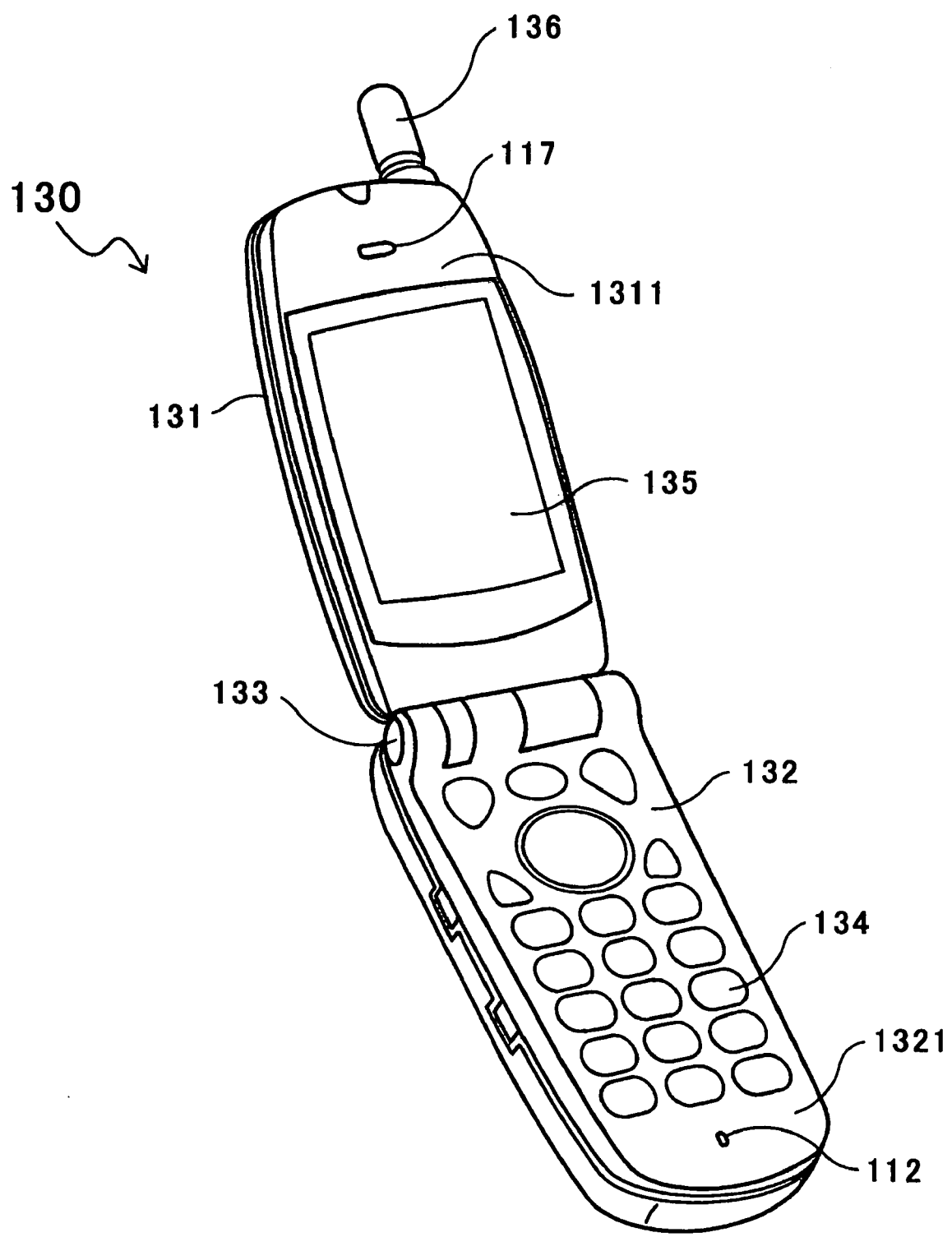
FIG. 10 is a perspective view of a mobile phone to which the multi-band wireless transceiver in accordance with the first embodiment of the present invention is applied.

FIG. 10 is a perspective view of a mobile phone 30 to which the multi-band wireless transceiver in accordance with the first embodiment of the present invention is applied.

As illustrated in FIG. 10, the mobile phone 130 is designed to include a first body 131 and a second body 132. The first body 131 is mechanically connected at one end thereof to the second body 132 through a hinge 133 such that the first and second bodies 131 and 132 are rotatable about the hinge 133 to each other. Specifically, the first and second bodies 131 and 132 can have a first position in which they are open to each other as illustrated in FIG. 10, and a second position in which they are closed to each other.

A plurality of keys 134 are arranged on a surface 1321 of the second body 132 which surface 1321 is located internal when the first and second bodies 131 and 132 are closed to each other. A user can input data and commands into the mobile phone 130 through the keys 134.

A liquid crystal display 135 is arranged at the center of a surface 1311 of the first body 131 located internal when the first and second bodies 131 and 132 are closed to each other. On the liquid crystal display 135 are displayed data and commands which a user input through the keys 134, a content of an e-mail having been received, or a telephone number of a person who made a call to the cellular phone 130.

An extendable antenna 136 is mounted on a rear surface of the first body 131.

Figure 11:
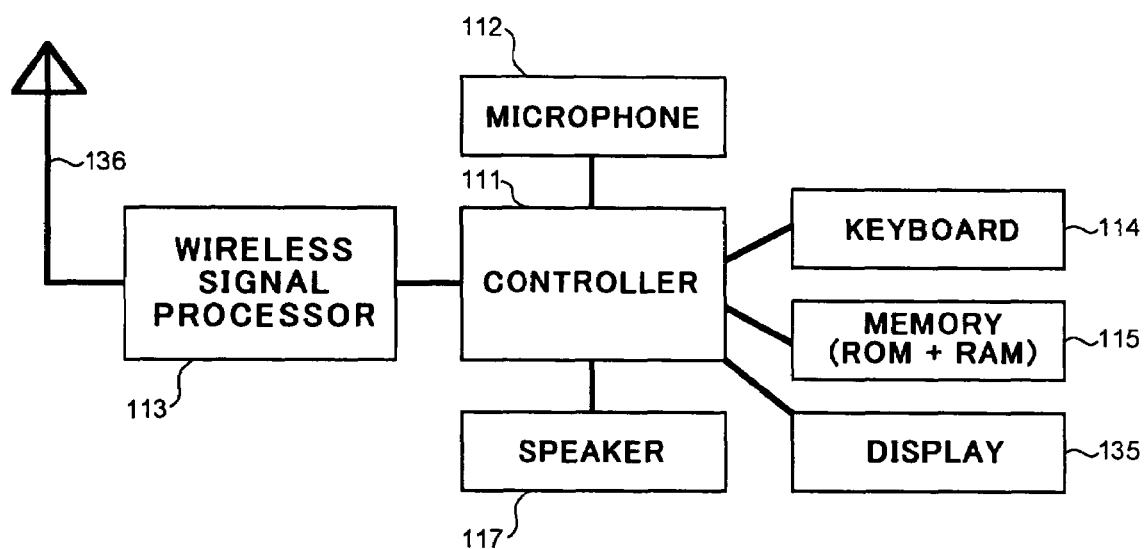
FIG. 11 is a block diagram of the mobile phone illustrated in FIG. 10.

FIG. 11 is a block diagram of the cellular phone 130.

As illustrated in FIG. 11, the mobile phone 130 is comprised of a controller 111, a microphone 112, a keyboard 114, a memory 115, the above-mentioned display 135, a speaker 117, a wireless signal processor 113, and the above-mentioned antenna 136.

The controller 111 controls operations of the microphone 112, the keyboard 114, the memory 115, the display 135, the speaker 117, and the wireless signal processor 113. For instance, the controller 111 is comprised of a central processing unit (CPU).

The microphone 112 receives voice signals of a user in communication.

The keyboard 114 is comprised of the above-mentioned keys 134. A user can input data into the controller 111 through the keyboard 114.

The memory 115 is comprised of a read only memory (ROM) and a random access memory (RAM). The read only memory (ROM) stores therein a control program for controlling an operation of the controller 111. The controller 111 reads the control program out of the read only memory (ROM), and operates in accordance with the control program. The random access memory (RAM) provides the controller 111 with an area in which the controller 111 carries out operations.

The display 135 is comprised of a liquid crystal display device for displaying images. The display 135 displays characters such as letters and images such as pictures. The display 135 acts as a monitor in TV-phone communication.

The speaker 117 outputs voice signals in communication.

The wireless signal processor 113 modulates signals to be transmitted, and demodulates signals having been received through the antenna 136. The wireless signal processor 113 includes therein the wireless band transceiver in accordance with the first embodiment, illustrated in FIG. 5.

Thus, the mobile phone 130 in accordance with the second embodiment provides the same advantages as those obtained by the first embodiment.

In the second embodiment, the present invention is applied to the mobile phone 130. It should be noted that the present invention may be applied to any mobile communication device such as PDA (Personal Digital Assistant).

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2004-260136 filed on Sep. 7, 2004 including specification, claims, drawings and summary is incorporated herein by reference in its entirety.

What is claimed is:

1. A multi-band wireless transceiver having a plurality of signal-processing paths, and further having a function of making wireless communication through a plurality of frequency bands by selecting one of said signal-processing paths, said multi-band wireless transceiver comprising:

a first synthesizer which transmits a local frequency signal for signal reception in accordance with divider data received from a controller which controls an operation of said multi-band wireless transceiver;

a second synthesizer which transmits a local frequency signal for signal transmission in accordance with divider data received from said controller; and a band identification circuit connected to receive said divider data from said first synthesizer and said second synthesizer, said band identification circuit identifying one of said plurality of said frequency bands in dependence on said divider data, and selecting one of said signal-processing paths in accordance with the identified frequency band.

2. The multi-band wireless transceiver as set forth in claim 1, wherein said band identification circuit transmits a control signal by which an active device electrically connected to the selected signal-processing path is allowed to receive power supply.

3. The multi-band wireless transceiver as set forth in claim 1, wherein said band identification circuit, said first synthesizer and said second synthesizer are integrated on a common chip.

4. The multi-band wireless transceiver as set forth in claim 1, wherein said band identification circuit selects a frequency band identified in dependence on divider data received by said first synthesizer, when frequency bands identified in dependence on divider data received by said first and second synthesizers are not coincident with each other.

5. The multi-band wireless transceiver as set forth in claim 1, wherein said band identification circuit turns off a power source providing power to a signal-transmission path, when frequency bands identified in dependence on divider data received by said first and second synthesizers are not coincident with each other.

6. The multi-band wireless transceiver as set forth in claim 1, wherein each of said first and second synthesizers is comprised of:
a reference oscillator which transmits a reference frequency signal;
a voltage controlled oscillator which transmits said local frequency signal;
an R-divider which divides said reference frequency signal by R wherein R indicates a number equal to or greater than two;
an N-divider which divides said local frequency signal by N wherein N indicates a number equal to or greater than two;
a phase-detector which compares a phase of a signal divided by said R-divider to a phase of a signal divided by said N-divider, and transmits a phase-difference signal indicating a difference between said phases;
a charge pump which generates a voltage in dependence on said phase-difference signal, and carries out negative feed-back control to an oscillation frequency of said voltage controlled oscillator;
an R-register which picks R-divider data directed thereto out of divider data received from said controller, and transmits the R-divider data to both said R-divider and said band identification circuit; and
an N-register which picks N-divider data directed thereto out of divider data received from said controller, and transmits the N-divider data to both said N-divider and said band identification circuit.

7. The multi-band wireless transceiver as set forth in claim 1, wherein each of said first and second synthesizers is comprised of:
a plurality of voltage controlled oscillators transmitting signals having different frequency ranges from one another; and a switch for selecting one of said voltage controlled oscillators,
said band identification circuit transmitting a control signal indicative of a certain voltage controlled oscillator among said voltage controlled oscillators, to said switch in accordance with a frequency band identified based on said divider data.

8. The multi-band wireless transceiver as set forth in claim 1, wherein each of said signal-processing paths is comprised of a first path for processing a received signal, and a second path for processing a signal to be transmitted,
said first path being comprised of:
a plurality of duplexers each in association with each of said frequency bands;
an antenna switch through which a wireless frequency signal received through an antenna is transmitted to the associated duplexer among said duplexers;
a plurality of low-noise amplifiers each in association with each of said frequency bands for amplifying signals output from said duplexers;
a plurality of first filters each in association with each of said frequency bands for removing frequency bands other than the associated frequency band in the amplified signals; and
a switch through which one of signals output from said first filters is transmitted to a common base band demodulator,
said second path being comprised of:
a plurality of driver amplifiers each in association with each of said frequency bands for amplifying a wireless frequency signal having been modulated in accordance with a base band signal;
a plurality of second filters each in association with each of said frequency bands for removing spurious parts existing out of a frequency band in the amplified wireless frequency signal;
a plurality of power amplifiers each in association with each of said frequency bands for amplifying wireless frequency signals output from said second filters; and
a plurality of isolators each in association with each of said frequency bands for transmitting said wireless frequency signals to said antenna through each of said duplexers and said antenna switch.

9. A method of controlling a multi-band wireless transceiver having a plurality of signal-processing paths, and further having a function of making wireless communication through a plurality of frequency bands by selecting one of said signal-processing paths, comprising:
identifying a frequency band in dependence on divider data received from a first synthesizer which transmits a local frequency signal for signal reception in accordance with divider data received from a controller which controls an operation of said multi-band wireless transceiver, and a second synthesizer which transmits a local frequency signal for signal transmission in accordance with divider data received from said controller; and
selecting one of said signal-processing paths in accordance with the identified frequency band.

10. The method as set forth in claim 9, wherein when frequency bands identified in dependence on divider data received through signal-transmission path and signal-reception paths are not coincident with each other, a frequency band identified in dependence on divider data received through signal-reception path is selected.

11. The method as set forth in claim 9, wherein when frequency bands identified in dependence on divider data received through signal-transmission path and signal-reception paths are not coincident with each other, a power source providing power to a signal-transmission path is turned off.

12. A computer program product having computer instructions, recorded on a computer readable medium, for enabling a computer executing the computer instructions to perform a method of controlling a multi-band wireless transceiver having a plurality of signal-processing paths, and further having a function of making wireless communication through a plurality of frequency bands by selecting one of said signal-processing paths, a first synthesizer which transmits a local frequency signal for signal reception in accordance with divider data received from a controller which controls an operation of said multi-band wireless transceiver, and a second synthesizer which transmits a local frequency signal for signal transmission in accordance with divider data received from said controller, the method comprising:
identifying a frequency band in dependence on said divider data received from said first synthesizer and said second synthesizer; and
selecting one of said signal-processing paths in accordance with the identified frequency band.

13. A mobile communication terminal comprising:
an antenna;
a controller which controls an operation of said mobile communication terminal;
a wireless signal processor which processes wireless signals having been received through said antenna and signals to be transmitted through said antenna, under control of said controller;
a microphone through which a user inputs voice signals into said controller;
a speaker through which a user listens to voice signals having been received through said antenna and having been processed in said wireless signal processor;
a keyboard through which a user transmits commands into said controller; and
a display on which images and data are displayed under control of said controller,
said wireless signal processor including a multi-band wireless transceiver having a plurality of signal-processing paths, and further having a function of making wireless communication through a plurality of frequency bands by selecting one of said signal-processing paths,
said multi-band wireless transceiver comprising a first synthesizer which transmits a local frequency signal for signal reception in accordance with divider data received from a controller which controls an operation of said multi-band wireless transceiver, a second synthesizer which transmits a local frequency signal for signal transmission in accordance with divider data received from said controller, and a band identification circuit connected to receive said divider data from said first multi-band wireless synthesizer and said second multi-band wireless synthesizer, said band identification circuit identifying one of said plurality of said frequency bands in dependence on said divider data, and selecting one of said signal-processing paths in accordance with the identified frequency band.

14. The mobile communication terminal as set forth in claim 13, wherein said band identification circuit transmits a control signal by which an active device electrically connected to the selected signal-processing path is allowed to receive power supply.

15. The mobile communication terminal as set forth in claim 13, wherein said band identification circuit, said first synthesizer and said second synthesizer are integrated on a common chip.

16. The mobile communication terminal as set forth in claim 13, wherein said band identification circuit selects a frequency band identified in dependence on divider data received by said first synthesizer, when frequency bands identified in dependence on divider data received by said first and second synthesizers are not coincident with each other.

17. The mobile communication terminal as set forth in claim 16, wherein said band identification circuit turns off a power source providing power to a signal-transmission path, when frequency bands identified in dependence on divider data received by said first and second synthesizers are not coincident with each other.

18. The mobile communication terminal as set forth in claim 13, wherein each of said first and second synthesizers is comprised of:
a reference oscillator which transmits a reference frequency signal;
a voltage controlled oscillator which transmits said local frequency signal;
an R-divider which divides said reference frequency signal by R wherein R indicates a number equal to or greater than two;
an N-divider which divides said local frequency signal by N wherein N indicates a number equal to or greater than two;
a phase-detector which compares a phase of a signal divided by said R-divider to a phase of a signal divided by said N-divider, and transmits a phase-difference signal indicating a difference between said phases;
a charge pump which generates a voltage in dependence on said phase-difference signal, and carries out negative feed-back control to an oscillation frequency of said voltage controlled oscillator;
an R-register which picks R-divider data directed thereto out of divider data received from said controller, and transmits the R-divider data to both said R-divider and said band identification circuit; and
an N-register which picks N-divider data directed thereto out of divider data received from said controller, and transmits the N-divider data to both said N-divider and said band identification circuit.

19. The mobile communication terminal as set forth in claim 13, wherein each of said first and second synthesizers is comprised of:
a plurality of voltage controlled oscillators transmitting signals having different frequency ranges from one another; and
a switch for selecting one of said voltage controlled oscillators,
said band identification circuit transmitting a control signal indicative of a certain voltage controlled oscillator among said voltage controlled oscillators, to said switch in accordance with a frequency band identified based on said divider data.

20. The mobile communication terminal as set forth in claim 13, wherein said mobile communication terminal is comprised of a mobile phone.

21. The mobile communication terminal as set forth in claim 20, wherein said mobile phone is comprised of a foldable mobile phone.

22. A computer program product having computer instructions, recorded on a computer readable medium, for enabling a computer executing the computer instructions to perform a method of controlling a multi-band wireless transceiver in a mobile communication terminal, having a plurality of signal-processing paths, and further having a function of making wireless communication through a plurality of frequency bands by selecting one of said signal-processing paths, a first synthesizer which transmits a local frequency signal for signal reception in accordance with divider data received from a controller which controls an operation of said multi-band wireless transceiver, and a second synthesize which transmits a local frequency signal for signal transmission in accordance with divider data received from said controller, the method comprising:

identifying a frequency band in dependence on said divider data received from said first synthesizer and said second synthesizer; and selecting one of said signal-processing paths in accordance with the identified frequency band.

* * * * *